(12) United States Patent
Hiernaux

(10) Patent No.: US 10,787,909 B2
(45) Date of Patent: Sep. 29, 2020

(54) ASYMMETRICAL SHROUD FOR A COMPRESSOR OF A TURBINE ENGINE

(71) Applicant: SAFRAN AERO BOOSTERS SA, Herstal (BE)

(72) Inventor: Stéphane Hiernaux, Oupeye (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 86 days.

(21) Appl. No.: 16/144,360

(22) Filed: Sep. 27, 2018

(65) Prior Publication Data

US 2019/0128122 A1 May 2, 2019

(30) Foreign Application Priority Data

Oct. 26, 2017 (BE) .................................. 2017/5765

(51) Int. Cl.
| | | |
|---|---|---|
| F01D 5/14 | (2006.01) | |
| F04D 29/68 | (2006.01) | |
| F04D 29/32 | (2006.01) | |
| F04D 29/54 | (2006.01) | |

(52) U.S. Cl.
CPC ............ *F01D 5/145* (2013.01); *F01D 5/143* (2013.01); *F04D 29/321* (2013.01); *F04D 29/542* (2013.01); *F04D 29/544* (2013.01); *F04D 29/681* (2013.01); *F05D 2240/30* (2013.01); *F05D 2250/71* (2013.01); *F05D 2250/711* (2013.01); *F05D 2250/712* (2013.01)

(58) Field of Classification Search
CPC .......... F01D 5/145; F01D 5/143; F01D 5/148; F01D 9/041; F04D 29/542; F04D 29/321; F04D 29/681; F04D 29/544; F05D 2250/71; F05D 2250/712; F05D 2250/711; F05D 2240/30; F05D 2240/123; F05D 2240/124
See application file for complete search history.

(56) References Cited

U.S. PATENT DOCUMENTS

| | | | | |
|---|---|---|---|---|
| 3,326,523 A | * | 6/1967 | Bobo ....................... | F01D 9/042 415/209.3 |
| 9,188,017 B2 | * | 11/2015 | Xu .......................... | F01D 5/143 |
| 10,458,248 B2 | * | 10/2019 | Wolfrum ................ | B63H 21/00 |

(Continued)

FOREIGN PATENT DOCUMENTS

| | | |
|---|---|---|
| EP | 1762700 A1 | 3/2007 |
| EP | 2597257 A1 | 5/2013 |

(Continued)

OTHER PUBLICATIONS

Search Report dated Jun. 12, 2018 for BE 201705765.

*Primary Examiner* — Nathaniel E Wiehe
*Assistant Examiner* — Eric A Lange
(74) *Attorney, Agent, or Firm* — James E. Walton

(57) ABSTRACT

In an axial turbomachine low-pressure compressor, the compressor, or booster, includes a first vane with an intrados surface, a second vane with an extrados surface, an inter-vane passage with a guiding surface, which connects the intrados surface to the extrados surface delimiting an annular vein, and which has a bulge and a recess forming a so-called 3D contouring geometry, or non-axisymmetric surface. The guiding surface includes an axially symmetrical or substantially flat zone, which axially extends through the inter-vane passage so as to separate the recess from the bulge.

14 Claims, 5 Drawing Sheets

(56) References Cited

U.S. PATENT DOCUMENTS

| | | | | |
|---|---|---|---|---|
| 2007/0059177 A1* | 3/2007 | Harvey | ................ | F04D 29/681 |
| | | | | 416/179 |
| 2010/0080708 A1* | 4/2010 | Gupta | .................... | F01D 5/143 |
| | | | | 416/223 A |
| 2011/0189023 A1* | 8/2011 | Guimbard | .............. | F01D 5/143 |
| | | | | 416/223 R |
| 2012/0201692 A1* | 8/2012 | Boston | ................... | F01D 5/143 |
| | | | | 416/242 |

FOREIGN PATENT DOCUMENTS

| | | |
|---|---|---|
| EP | 2696029 A1 | 2/2014 |
| FR | 3011888 A1 | 4/2015 |
| WO | 2014105270 A2 | 7/2014 |

\* cited by examiner

ASYMMETRICAL SHROUD FOR A COMPRESSOR OF A TURBINE ENGINE

This application claims priority under 35 U.S.C. § 119 to Belgium Patent Application No. 2017/5765, filed 26 Oct. 2017, titled "Asymmetrical Shroud for a Compressor of a Turbine Engine," which is incorporated herein by reference for all purposes.

BACKGROUND

1. Field of the Application

The present application relates to a bulge and a recess shape in an inter-vane passage of a turbomachine compressor. The present application also relates to an axial turbine engine, in particular, an aircraft turbojet engine or an aircraft turboprop engine.

2. Description of Related Art

The document FR3011888 A1 discloses a turbojet engine with a compressor part comprising at least a first and a second vane, and a platform from which the vanes extend. The platform has a non-axisymmetric surface limited by a first and a second external plane, and defined by at least two CI class construction curves each representing the value of a radius of said surface as a function of a position between the intrados of the first vane and the extrados of the second vane in a plane substantially parallel to the external planes. This particular non-axisymmetric geometry of the surface of the part offers a control of the flow, however it limits the flow, in particular because of detachments in vane corners. A pumping phenomenon can occur.

Although great strides have been made in the area of axial turbomachine compressors, many shortcomings remain.

DETAILED DESCRIPTION OF THE PREFERRED EMBODIMENT

Figure 1:
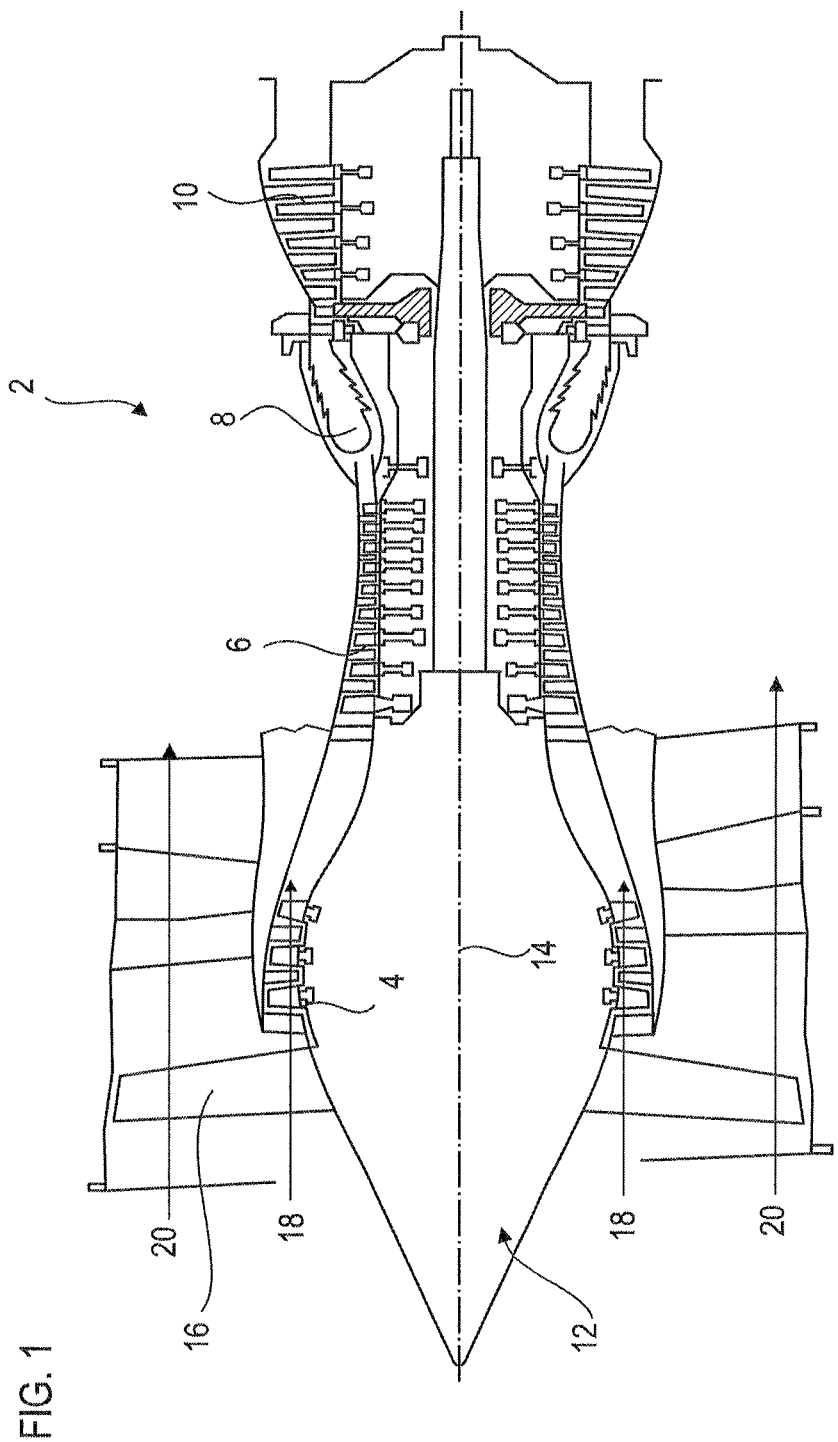
FIG. 1 represents an axial turbomachine according to the present application.

The present application aims to solve at least one of the problems posed by the prior art. More specifically, the present application aims at optimizing the flow rate and the compression ratio of a compressor. The present application also aims at providing a simple solution, resistant, lightweight, economical, reliable, easy to produce, conveniently maintainable, and easy to inspect.

The subject of the present application is an axial turbomachine compressor, in particular an axial turbomachine low-pressure compressor, the compressor comprising: an annular vein; a first vane with a surface intrados; a second vane with an extrados surface facing the intrados surface of the first vane; an inter-vane passage with a guiding surface which connects the intrados surface to the extrados surface radially delimiting the annular vein, and which has a main bulge and a main recess; wherein the guiding surface comprises an axially symmetrical or substantially planar zone which extends axially through the inter-vane passage so as to connect the main recess to the main bulge. The bulge extends circumferentially from the extrados surface of the second vane, and includes a vertex against the extrados surface. The recess extends circumferentially from the intrados surface of the first vane, and comprises a bottom against the intrados surface. The bulge is convex and the recess is concave.

According to advantageous embodiments of the present application, the compressor can comprise one or more of the following characteristics, taken separately or according to any of the possible technical combinations:

- The axisymmetric zone has a minimum width axially between the vertex of the bulge and the bottom of the recess.
- The bulge and the recess overlap axially, possibly over the entire length of the recess.
- The length of the bulge is greater than the length of the recess.
- Between the recess and the bulge, the axisymmetric zone extends over most of the width of the inter-vane passage.
- The recess comprises a depth P and the bulge has a height H, the depth P and/or the height H representing at least 0.50%, or 2% of the average height of the vanes.
- The maximum height of the bulge is greater than the maximum depth of the recess.
- The maximum height of the bulge is greater than or equal to 3.00 mm, and/or the maximum depth of the recess is greater than or equal to 2.00 mm.
- The volume of the bulge is greater than or equal to three times the volume of the recess, and/or the area of the bulge is greater than or equal to twice the area of the recess.
- Cumulative, the area of the recess and the area of the bulge represent at most one fifth of the guiding surface.
- The inter-vane passage comprises a downstream half, and an upstream half in which the bulge and the recess are enclosed.
- The guiding surface comprises an upstream zone extending axially on at least 10% of the vanes, and axially separating the leading edges of the recess and the bulge.
- The length of the bulge is between: 20% and 80%, or 30% and 50% of the length of the second vane.
- The length of the recess is between: 20% and 50% the length of the first vane.
- The width of the bulge and/or the width of the recess is/are between: 10% and 50% of the width of the inter-vane passage.
- The intrados surface and the extrados surface each comprise a connecting radius axially through the recess and the bulge respectively.
- The bulge is radially more developed than the recess.
- The recess and the bulge are non-axisymmetric, and/or at least twice as long as wide.
- The axisymmetric zone extends over the majority of the area of the guiding surface, in particular on the majority of the upstream half comprising the recess and the bulge.
- The guiding surface comprises a downstream zone extending axially over or less than 30% of the first vane or the second vane, and separating the recess and the bulge trailing edges.
- The bulge has a vertex and the recess has a bottom aligned axially with the vertex.

The bulge is arranged in the circumferentially opposite passage of the recess.

The guiding surface, including the bulge and the recess are in contact with the flow of the compressor.

The guiding surface has a downstream half and an upstream half in which are contained the bulge and the recess.

Each vane comprises a chord whose angle of inclination with respect to the axis of rotation is less than or equal to 15°, or 30°, or 40°.

The axisymmetric zone extends over at least 70%, or 80%, or 90% of the area of the guiding surface.

The passage comprises an upstream axis connecting the leading edges, and a downstream axis connecting the trailing edges, said axes defining axially the guiding surface.

The first vane and the second vane are consecutive vanes and/or neighboring an annular row of vanes, and/or inclined at most: 10° or 5° relative to each other around the axis of rotation of the compressor.

Axially at the trailing edge, the intrados surface and/or the extrados surface are parallel (s) to the axis of rotation of the compressor.

The bulge and/or the recess are at axial distance from the leading edges and/or the trailing edges of the vanes.

Each vane comprises a connection radius, the guiding surface extending from the connecting radii of the first vane and the second vane.

The bulge is convex, in at least two directions, and/or forms a thickening on the support.

The recess is concave, in at least two directions, and/or forms a thinning on its support.

The circumferential width of the recess and/or the bulge is less than or equal to the width of the vane.

The subject of the present application is also a turbine engine compressor vane, the vane comprising a fixing platform which comprises a surface for guiding a compressor flow, and two lateral edges designed to match the identical vane side edges of an annular row of vanes, and a vane extending radially from the guiding surface, the vane comprising an intrados surface delimiting a first inter-vane passage and an extrados surface delimiting a second inter-vane passage, the guiding surface comprising a main recess on the side of the intrados, and a main bulge on the side of the extrados, wherein the guiding surface comprises a first axially symmetrical or substantially planar zone which passes axially through the first inter-vane passage so as to separate the main recess from one of the two lateral edges, and a second axisymmetric or planar zone which axially crosses the second inter-vane passage so as to separate the main bulge from the other of the two side edges, wherein the bulge is of convex shape, extends circumferentially from the extrados surface, and comprises a vertex against the extrados surface and wherein the recess is of concave shape, extends circumferentially from the intrados surface, and comprises a bottom against the intrados surface.

The subject of the present application is also a turbomachine, in particular an aircraft turbojet, comprising a compressor and/or at least one vane, with a compressor or a vane according to the embodiments disclosed above.

In general, the advantageous embodiments of each object of the present application are also applicable to the other objects of the present application. Each object of the present application is combinable with other objects, and the objects of the present application are also combinable with the embodiments of the description.

Through the present application, the pressure or the compression ratio in the passage increases, as does the air flow. In the operating conditions of a compressor, the bulges and recesses treat the phenomena of swirls and detachments of the air flow. The flow passing through the passage reaches the extrados during its compression, which limits its detachment.

In the following description, the terms "internal" and "external" refer to a positioning relative to the axis of rotation of an axial turbomachine. The axial direction corresponds to the direction along the axis of rotation of the turbomachine, the lengths being measured axially. The widths are measured according to the circumference. The radial direction is perpendicular to the axis of rotation. Upstream and downstream are in reference to the stream of the flow in the turbomachine.

FIG. 1 is a simplified representation of an axial turbomachine. It is in this case a double-flow turbojet engine. The turbojet engine 2 comprises a low-pressure compressor 4, a high-pressure compressor 6, a combustion chamber 8 and one or more, levels of turbines 10. In operation, the mechanical power of the turbine 10 transmitted via the central shaft up to the rotor 12 sets in motion the two compressors 4 and 6. The latter comprises several rows of rotor vanes associated with rows of stator vanes. The rotation of the rotor about its axis of rotation 14 thus makes it possible to generate an air flow and to compress it progressively until it reaches the combustion chamber 8.

A fan 16 is coupled to the rotor 12 and generates a stream of air which splits into a primary flow 18 and a secondary flow 20 passing through an annular duct (partially shown). The secondary flow 20 is accelerated to generate a thrust response useful to the flight of an aircraft. The primary 18 and secondary 20 flows are annular.

Figure 2:
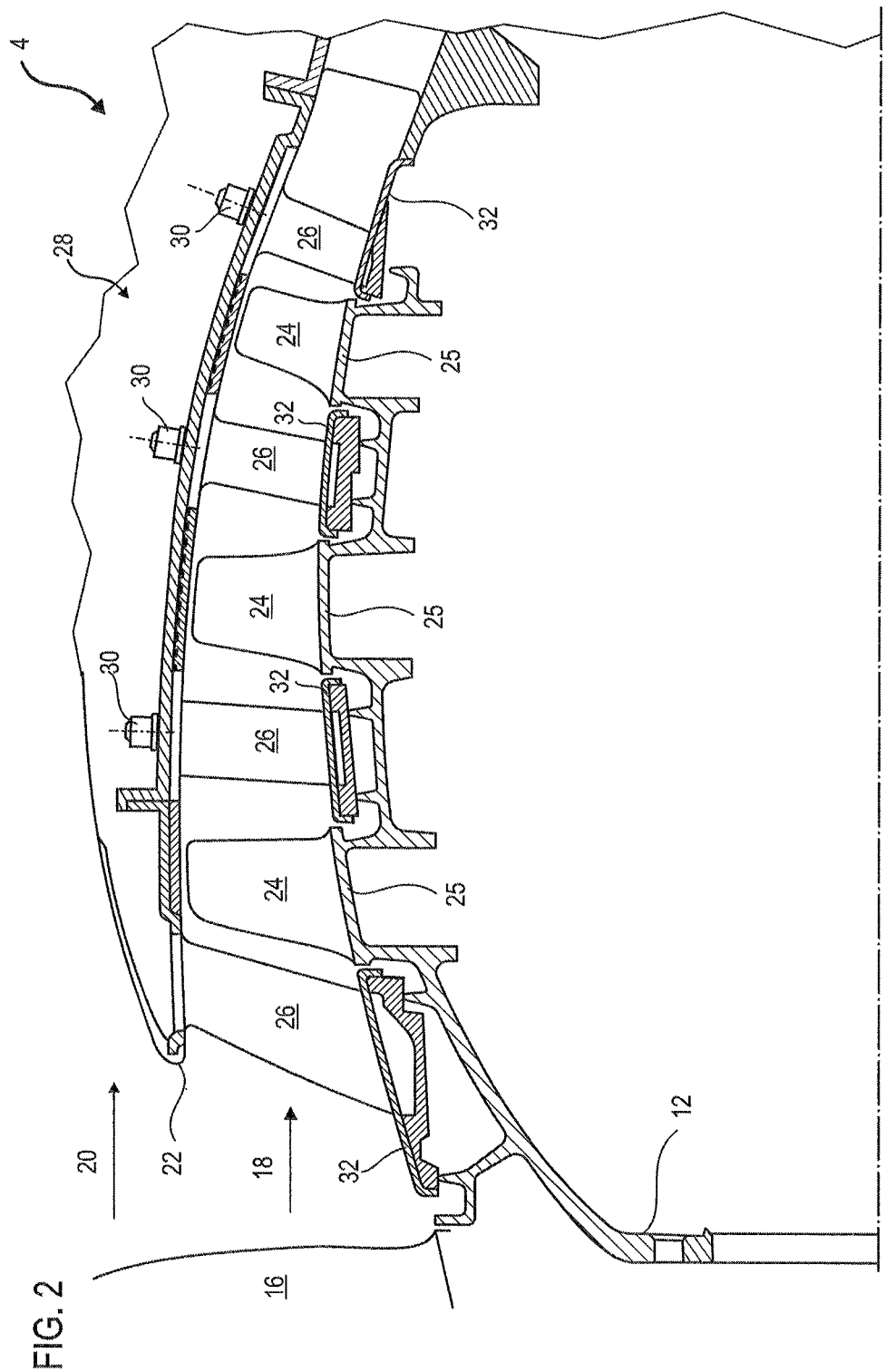
FIG. 2 is a diagram of a turbomachine compressor according to the present application.

FIG. 2 is a sectional view of a compressor of an axial turbomachine such as the one drawn on FIG. 1. The compressor can be the low-pressure compressor 4. There can be seen a part of the fan 16 and the nozzle of separation 22 of the primary flow 18 and the secondary flow 20.

The rotor 12 comprises several rows of rotor vanes 24, in this example three. The rotor vanes 24 may extend radially from a dovetail platform, or from a bladed drum inner ring.

The compressor 4 comprises several deflectors, in this case four, each containing a row of stator vanes 26. The deflectors are associated with the fan 16 or a row of rotor vanes to straighten the air flow, so as to convert the speed of the flow into pressure, in particular into static pressure.

The stator vanes 26 extend essentially radially from an outer casing 28. They can be fixed and maintained static by means of fixing pins 30. They pass radially through the primary flow 18. The stator vanes may be with constant chord with respect to casing 28. Advantageously, the vanes of the same row are identical and aligned. Each row may comprise at least one hundred vanes (26; 24).

Internal shrouds 32 may be suspended at the inner ends of the stator vanes 26. The inner shrouds 32 may be sealed with the rotor 12.

Figure 3:
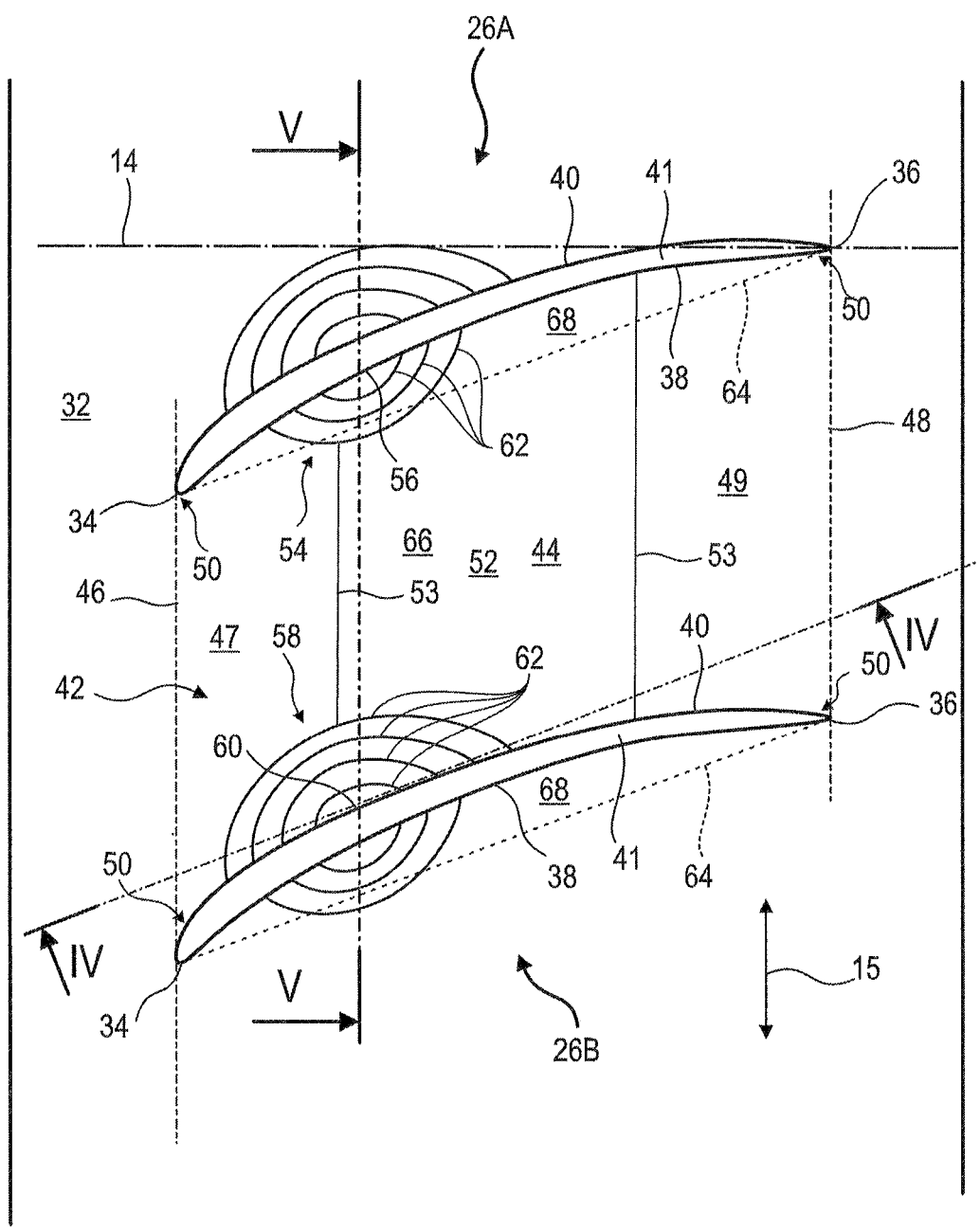
FIG. 3 illustrates two compressor vanes bordering a guiding surface according to the present application.

FIG. 3 outlines two vanes (26A, 26B) representing of an annular row. The row may be one of the rows presented in connection with the preceding figures. The vanes (26A, 26B) and their support, optionally the inner shroud 32, are shown in front view. The axis of rotation 14 is plotted at a figurative position to provide a spatial landmark.

Each vane (26A; 26B) comprises a leading edge 34, a trailing edge 36, an intrados surface 38 and an extrados surface 40. These surfaces (38; 40) can be curved. Each of these surfaces extends from the leading edge 34 to the corresponding trailing edge 36. Each vane may comprise a stack of aerodynamic arched profiles 41, whose sides generate the intrados surface 38 and the extrados surface 40. At the trailing edges 36, the contours of the profiles 41, intrados and/or extrados, are parallel and/or tangent to the axis of rotation 14 of the compressor.

The consecutive vanes (26A, 26B) of the annular row define between them a passage 42, also called an inter-vane passage 42. This passage 42 is circumferentially partitioned by the vanes (26A; 26B), and delimited by the intrados and extrados surfaces. The passage 42 may have a guiding surface 44 between the two consecutive vanes (26A; 26B), and may connect the intrados surface 38 which faces the extrados surface 40 through the passage 42.

The guiding surface 44 may be defined axially by an upstream axis 46 and a downstream axis 48 which connect the leading edges 34 and the trailing edges 36 respectively. These axes (46; 48) can be parallel, and can generally define a parallelogram or a trapezoid. The guiding surface 44 may be generally planar.

More specifically, the guiding surface 44 may be a tubular surface portion or a cone surface portion, in particular because of the radius of the shroud and the optional diameter variation of the shroud 32 along the axis of rotation 14. It may comprise four corners 50 corresponding to the intersections between the edges (34; 36) and the support, in this case the shroud 32, for example internal.

The guiding surface 44 has an axisymmetric zone 52, possibly flat, which extends axially through the passage 42. The axisymmetric zone 52 may be formed of arcs 53 of constant radii around the axis of rotation 14. Some of the arches 53 extend circumferentially from the intrados surface 38 to the extrados surface 40. The guiding surface 44 may be mainly formed of these arches 53.

The guiding surface 44 also comprises a main recess 54 with a bottom 56 radially forming its extremum, and a main bulge 58 with a top or vertex 60 radially forming its extremum. The main recess 54 and the main bulge 58 are "main" insofar as they respectively form the main recess and bulge, and/or area, and/or height of the guiding surface 44.

The recess 54 and the bulge 58 may be at the same level axially; they can expand along each other axially. The bottom 56 and the vertex 60 may coincide axially. Some arches 53 can extend from the recess 54 to the bulge 58. Thus, the axisymmetric zone 52 circumferentially separates the recess 54 from the bulge 58, while passing through the passage 42. The axisymmetric zone 52 may comprise a circumferential narrowing 66 between the Recess 54 and the bulge 58. This narrowing 66 can form the lesser axial portion of the axisymmetric zone 52.

The recess 54 and the bulge 58 are represented by means of level lines 62. These level lines 62 indicate radial level variations with respect to a reference surface, in this case the guiding surface 44, and particular with respect to the axisymmetric zone 52.

The recess 54 and the bulge 58 may extend axially over more than half of the vanes (26A; 26B). The bulge 58 may be longer than the recess 54. It may extend axially over 35%, +/−5%, of the chord 64 of the second vane 26B. The recess 54 may extend axially 25%, +/−5%, of the chord 64 of the first vane 26A.

The axisymmetric zone 52 may comprise an upstream section 47 extending downstream from the upstream axis 46, and a downstream section 49 extending upstream from the downstream axis 48. The recess 54 and the bulge 58 may be remote from the leading edges 34, including 10% axial length of a chord 64. They are separated by the upstream section 47 can form a parallelogram.

According to the circumference 15, the recess 54 may extend over 15% of the inter-vane passage 42 and extend from the intrados surface 38. Its bottom 60 may be against the intrados surface 38. The bulge 58 may extend circumferentially on 20% of the passage 42, its vertex 60 can be attached to the extrados surface 40 of the second vane 26B.

Each vane (26A; 26B) comprises a chord 64 and a space 68 between its intrados surface 38 and its chord 64. Each bottom 56 of recesses 54 may be the interior of said space 68. Optionally, each recess 54 is predominantly, or totally within the corresponding space 68. Optionally, between 40% and 80% of each recess 54 is within the corresponding space 68.

Figure 4:
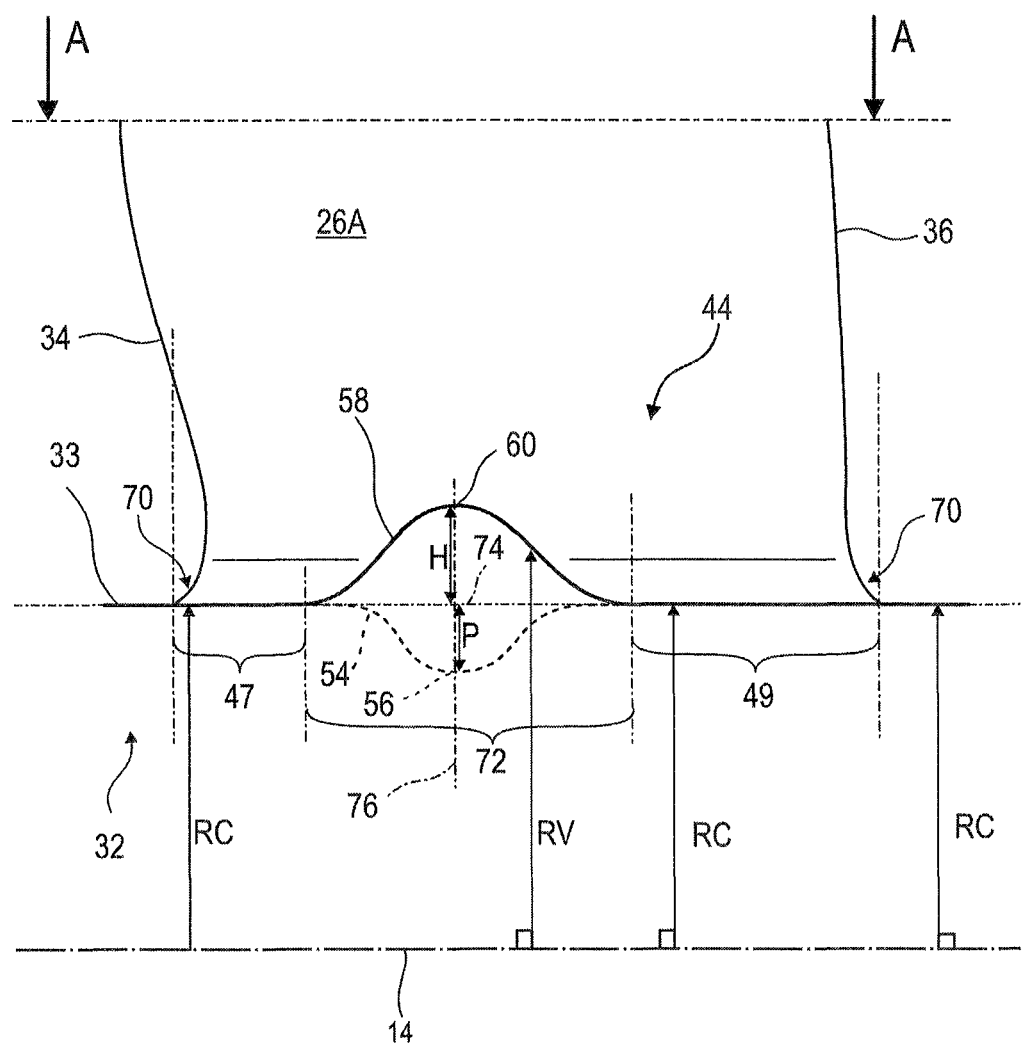
FIG. 4 is a cross-section of FIG. 3 along the axis IV-IV.

FIG. 4 is a cross section of FIG. 3 along the axis IV-IV. The inclination of the axis of rotation 14 relative to the support is figurative and may vary in practice.

In general, the vanes may comprise connecting radii 70 at their radial ends. Each connection radius 70 may surround its respective vane. The guiding surface 44 can extend from the connecting spokes 70 so as to connect them in pairs. The radial thickness of the connecting radii 70 is smaller than the height H of the bulge 58 and the depth P of the recess 54.

The leading edge 34 and the trailing edge 36 of the first vane 26A extending radially from the annular surface 33 of the inner shroud 32. This annular surface 33 may have a constant radius RC outside the non-axisymmetric zone. 72 receiving the bulge and the recess; where the variable radius RV evolves according to the angular position about the axis of rotation 14. The annular surface 33 may have axial symmetry. The zones 47 and 49 can extend the annular surface 33 and be axially tangential thereto. They may have RC constant radius arcs depending on the circumference.

A dot-dashed line 74 extends the zones 47 and 49, and connects them. The recess 54 in the background is represented by a dotted line. The radial distance between the dot-dashed line 74 and the recess 54 or the bulge 58, respectively, shows their radial dimensions, i.e. the maximum depth reached by the bottom 56, and the maximum height defined by the vertex 60. A line 76 joins the vertex 60 to the bottom 56, which emphasizes the axial alignment of these extremes in this particular embodiment.

The present teaching can also be applied to an outer shell or to the outer casing by symmetry axis A-A.

Figure 5:
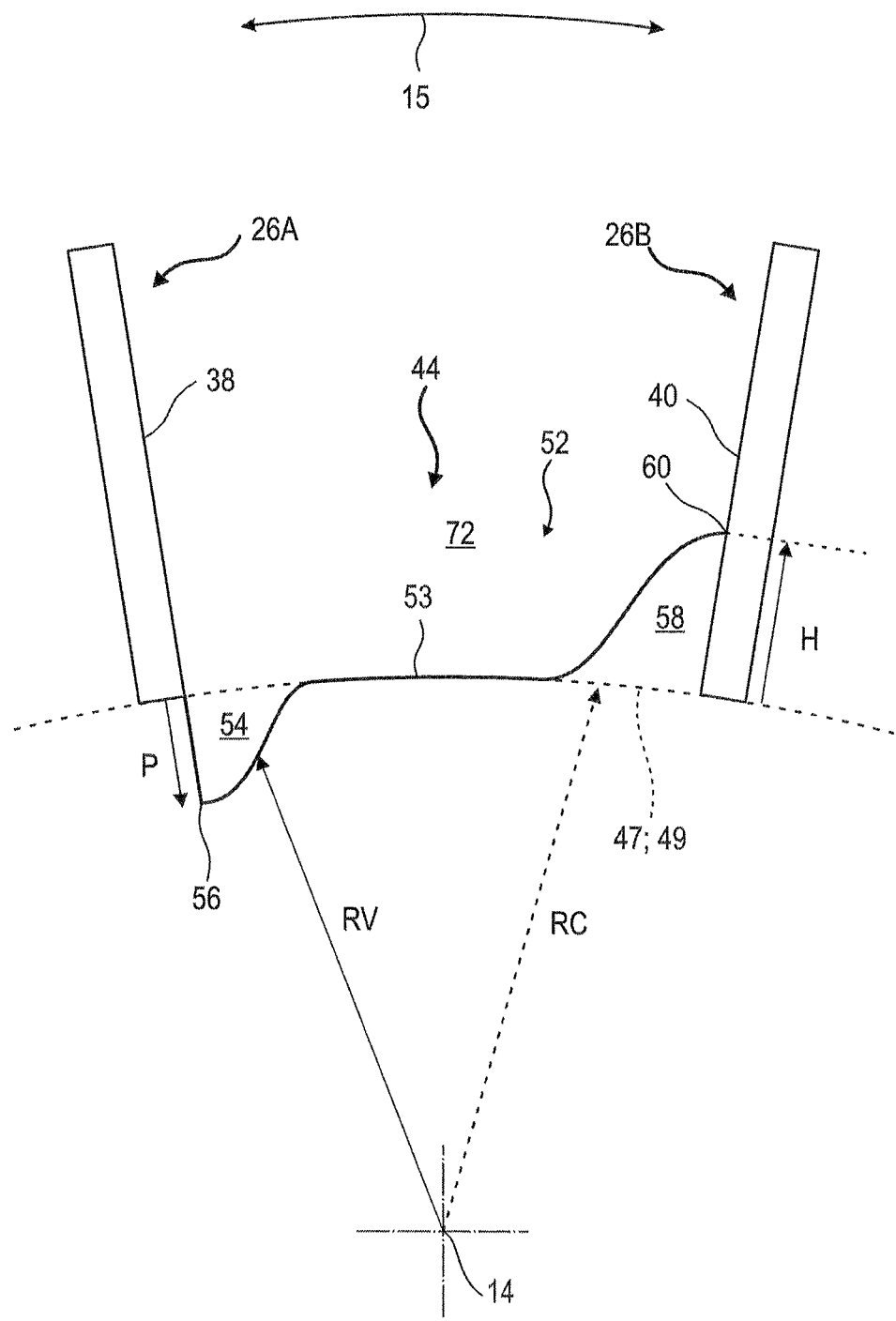
FIG. 5 is a cross-section of FIG. 3 along the axis V-V.

FIG. 5 is a cross section of FIG. 3 along the axis V-V. The section is perpendicular to the axis of rotation 14, and passes through the recess 54 and the bulge 58.

Around the axis of rotation 14, the guiding surface 44 has a constant radius RC in contact with the arc 53 of the axisymmetric zone 52. This constant radius RC may correspond to that of the first zone 47 and/or to that of the second zone 49. At the recess 54 and the bulge 58, whose bottom 56 and the vertex 60 are shown, it shows a variable radius RV, in the non-axisymmetric zone 72.

The guiding surface 44 has a particular profile. It has an increase of radial material with respect to its base, in particular generated by the zones (47; 49). At a given point of the axis of rotation 14 disposed at the recess 54 and the bulge 58, the radius RV of the guiding surface 44 can fluctuate as it angularly traverses the joining surface 44 in the circumferential direction 15, in particular by moving from the first vane 26A to the second vane 26B, or between the intrados surface 38 and the extrados surface 40.

Although only two vanes are shown, the present teaching can be applied to all, or several, or each annular row of compressor vanes. Similarly, the guiding surface can be reproduced identically between each neighboring vane. This can form several annular rows of identical bulges and identical recesses.

Alternatively, the support can be replaced with vane attachment platforms. Each vane (26A, 26B) can be associated with an individual attachment platform. In the row, the lateral edges of the platforms match each other, and each form a portion of axisymmetric zone.

The teachings of each figure may be independently combined with the teachings of each of the other figures. The present application provides a combination of the teachings of all the figures and/or with a combination of the whole of the technical solution.

I claim:

1. An axial turbomachine compressor, comprising:
   a first vane with a surface intrados;
   a second vane with an extrados surface facing the intrados surface of the first vane; and
   an inter-vane passage with a guiding surface which connects the intrados surface to the extrados surface and which has a bulge and a recess;
      wherein the guiding surface comprises:
         an axially symmetrical or planar zone which extends axially through the inter-vane passage so as to separate the recess from the bulge; and
      wherein the bulge is of convex shape, extends circumferentially from the extrados surface of the second vane, and comprises:
         a vertex against the extrados surface; and
      wherein the recess is of concave shape, extends circumferentially from the intrados surface of the first vane, and comprises:
         a bottom against the intrados surface,
   wherein the first vane has a length and the recess has an axial length which is between 20% and 50% of the length of the first vane.

2. The compressor according to claim 1, wherein the axially symmetrical or planar zone has a minimum width that is arranged axially between the axial position of the vertex and the axial position of the bottom.

3. The compressor according to claim 1, wherein at least part of the bulge and part of the recess share a common axial position.

4. The compressor according to claim 1, wherein the bulge has an axial length and the recess has an axial length, and wherein the length of the bulge is greater than the length of the recess.

5. The compressor according to claim 1, wherein between the recess and the bulge, the axially symmetrical or planar zone extends over more than half of the width of the inter-vane passage.

6. The compressor according to claim 1, wherein the vanes have a height, the recess has a depth P and the bulge has a height H, the depth P and the height H representing at least 0.50%, or 2% of the height of the vanes.

7. The compressor according to claim 1, wherein the recess has a depth and the bulge has a height, the height of the bulge being greater than the depth of the recess.

8. The compressor according to claim 1, wherein the inter-vane passage comprises:
   an upstream half in which the bulge and the recess are arranged.

9. The compressor according to claim 1, wherein the first and second vanes have leading edges, the guiding surface comprises:
   an upstream zone extending axially over at least 10% of the vanes, and axially separating the leading edges from the recess and from the bulge.

10. The compressor according to claim 1, wherein the second vane has a length and the bulge has an axial length which is between 30% and 50% of the length of the second vane.

11. The compressor according to claim 1, wherein the inter-vane passage has a width, and the bulge and the recess have a respective width which is between 10% and 50% of the width of the inter-vane passage.

12. The compressor according to claim 1, wherein the intrados surface and the extrados surface each comprise:
   a connecting radius axially extending through the recess and the bulge respectively.

13. A turbomachine compressor vane, comprising:
   a fixing platform which comprises:
      a surface for guiding a compressor flow;
      two lateral edges designed to match the identical vane side edges of an annular row of vanes; and
      a vane extending radially from the guiding surface, the vane comprising:
         an intrados surface delimiting a first inter-vane passage; and
         an extrados surface delimiting a second inter-vane passage, the guiding surface comprising:
            a recess on the side of the intrados;
            a bulge on the side of the extrados;
            a first axially symmetrical or substantially planar zone which passes axially through the first inter-vane passage, so as to separate the recess from one of the two lateral edges; and
            a second axisymmetric or planar zone which axially crosses the second inter-vane passage, so as to separate the bulge from the other of the two side edges;
         wherein the bulge is of convex shape, extends circumferentially from the extrados surface, and comprises:
            a vertex against the extrados surface; and
         wherein the recess is of concave shape, extends circumferentially from the intrados surface, and comprises:
            a bottom against the intrados surface;
      wherein the vane extending radially from the guiding surface further comprises at least one of:
         the second inter-vane passage having a length and the bulge having an axial length which is between 30% and 50% of the length of the second inter-vane passage; and
         the first inter-vane passage having a length and the recess having an axial length which is between 20% and 50% of the length of the first inter-vane passage.

14. An axial turbomachine compressor, comprising:
   a first vane with a surface intrados;
   a second vane with an extrados surface facing the intrados surface of the first vane; and
   an inter-vane passage with a guiding surface which connects the intrados surface to the extrados surface and which has a bulge and a recess;
      wherein the guiding surface comprises:
         an axially symmetrical or planar zone which extends axially through the inter-vane passage so as to separate the recess from the bulge; and wherein the bulge is of convex shape, extends circumferentially from the extrados surface of the second vane, and comprises:
a vertex against the extrados surface; and
wherein the recess is of concave shape, extends circumferentially from the intrados surface of the first vane, and comprises:
a bottom against the intrados surface,
wherein the second vane has a length and the bulge has an axial length which is between 30% and 50% of the length of the second vane.

* * * * *